DRIVER-SENSE CIRCUIT ARRANGEMENT

Filed Dec. 30, 1965 Sheet 1 of 2

INVENTOR.
A. KARL RAPP
BY John V. Regan
Attorney

INVENTOR.
A. KARL RAPP
BY John V. Regan
Attorney

United States Patent Office 3,440,444
Patented Apr. 22, 1969

3,440,444
DRIVER-SENSE CIRCUIT ARRANGEMENT
Adolph Karl Rapp, Princeton, N.J., assignor to Radio Corporation of America, a corporation of Delaware
Filed Dec. 30, 1965, Ser. No. 517,701
Int. Cl. H03k 19/08, 19/22, 19/30
U.S. Cl. 307—238 10 Claims

ABSTRACT OF THE DISCLOSURE

A driver-sense arrangement for a storage cell. A common input-sense line is coupled to the input point of the cell and is also coupled to the conduction path of a coincidence gate, the impedance of which is controlled jointly by the output of the cell and by a control signal. A low impedance current sensor is coupled to the line for sensing the output of the cell via the gate.

It has been suggested that a high speed memory for a data processing system take the form of a plurality, e.g. an array, of active memory elements. It has been suggested further that the memory elements be flip-flops employing field-effect transistors, and that the entire memory array be fabricated as an integrated structure in order to provide a large quantity of storage in a small area and to reduce line delays so as to achieve high speed operation.

In an integrated memory array, it is desirable to minimize the number of row and column conductors so as to reduce the number of crossovers in the integrated array and the number of external connections to the memory.

It is one object of this invention to provide an arrangement whereby information may be written into a flip-flop and the output of the flip-flop may be sensed via a common input-output line.

It is another object of this invention to provide an arrangement which reduces the number of row and column conductors required in an integrated memory of active storage elements.

It is still another object of this invention to provide a circuit arrangement for both writing information into a memory element and sensing the output of that element via a common input-sense line, in which the sensing operation does not destroy the stored information.

The capacitance on the output line of an integrated memory may be quite high, especially when the active memory elements employe insulated-gate field-effect transistors. Higher speed operation obtains when current sensing is employed, as opposed to voltage sensing, since it then is unnecessary to charge or discharge the capacitance through a high impedance.

Accordingly, it is a further object of this invention to provide a circuit arrangement for both writing information into a memory element and sensing the output of that element on a common input-sense line, in which current sensing is employed.

In an arrangement embodying the invention, a common input-sense line is connected to the input means of a memory element. This line also is connected to the conduction path of a coincidence gate means, the impedance of which is controlled jointly by the output of the memory element and by a control signal source. The voltage on the line is controlled in accordance with the operation being performed, and a low impedance current sensor is coupled to the line for sensing the output of the memory element via the coincidence gate means.

In the accompanying drawing, like reference characters denote like components, and:

Figures 1, 2:
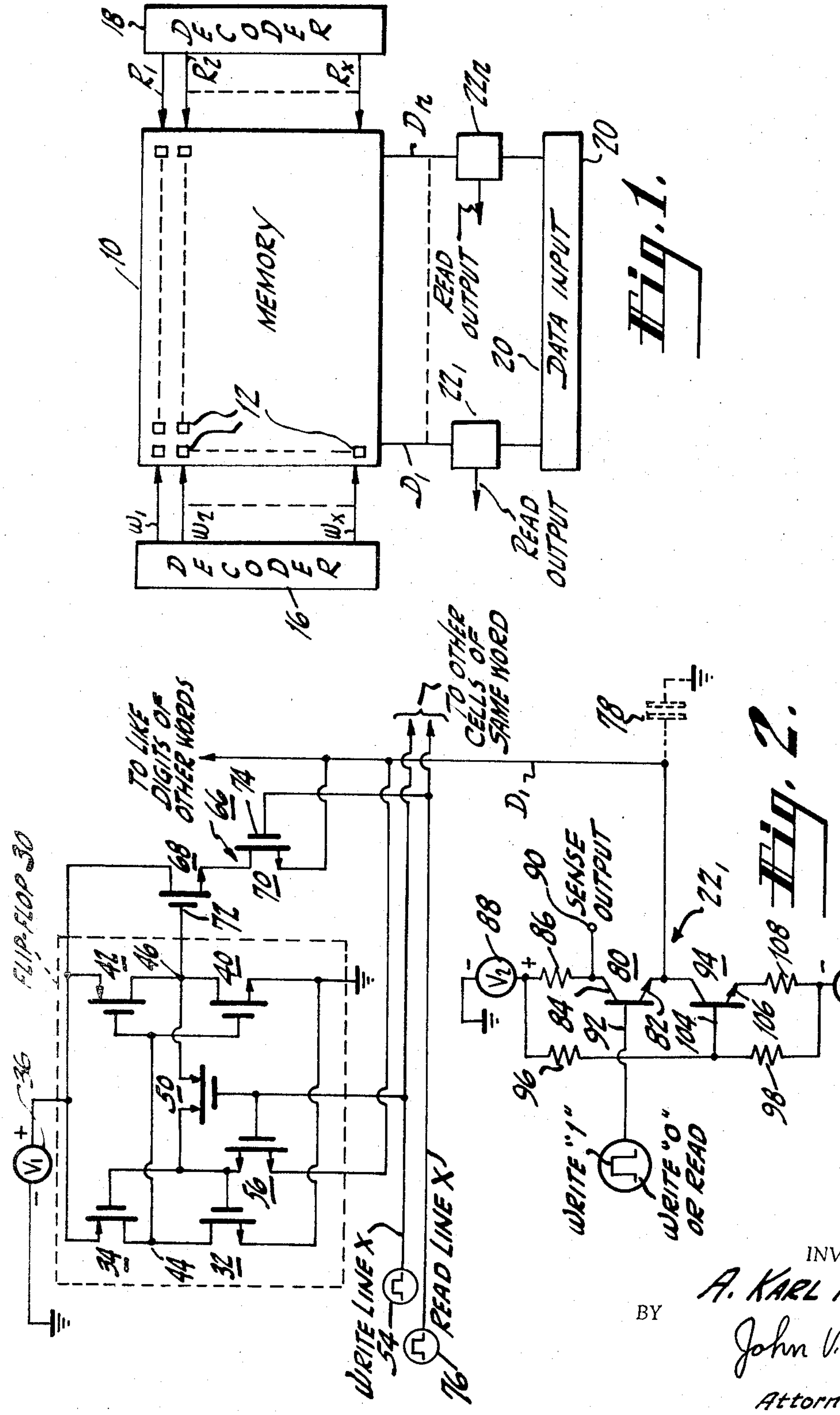
FIGURE 1 is a block diagram of a memory system.
FIGURE 2 is a schematic diagram of one of the memory cells and a driver-sense circuit for that cell and others of the same column.

In the system of FIGURE 1, a memory 10 comprises a plurality of memory elements 12, only a few of which are shown. These memory elements may be arranged in a rectangular array of rows and columns. For purposes of example, it is assumed that the memory is word organized, wherein each row of memory elements stores a different word of information, and wherein the memory elements in the same column store the digits of like place or significance in the respective words. Each row of elements has a pair of row conductors, one for receiving WRITE command levels and the other for receiving READ command levels. All of the WRITE lines $W_1$, $W_2$ . . . $W_X$ are connected at their input ends to a decoder 16, which receives input signals from a source (not shown) and energizes a selected one only of the WRITE lines during a WRITE operation. The READ lines $R_1$, $R_2$ . . . $R_X$ are connected to a decoder 18 which, in response to received input signals, energizes a selected one only of the READ lines during a READ opeartion. Although separate decoders 16 and 18 are illustrated, a single decoder could be employed with suitable output logic to drive the WRITE and READ lines of the memory.

Signals representing a word to be written into a row of the memory are supplied from a data input source 20 by way of DIGIT lines $D_1$ . . . $D_n$, there being a separate DIGIT line for each column of memory elements. The data stored in the input device 20 is written into a given row of memory elements 12 when the WRITE line for that row is energized.

In order to reduce or minimize the number of row and column lines in the memory, it is desirable to use the DIGIT lines $D_1$ . . . $D_n$ for both writing information into the memory and for reading out (sensing) information stored in the memory. As will be described, the information stored in a row of the memory may be read out selectively and nondestructively on the DIGIT lines when the READ control line for that row is energized. Circuitry for both driving the DIGIT lines and for output sensing are contained with in the boxes $22_1$ . . . $22_n$, and will be described All of the memory elements 12 in memory 10 are structurally the same and may take the form of an insulated-gate field-effect transistor flip-flop. The flip-flop for the memory cell at the intersection of row X and column 1 is illustrated within the dashed box 30 of FIGURE 2, and the driver-sense circuit $22_1$ for the associated column of flip-flops is shown at the bottom of FIGURE 2.

This flip-flop is known in the art and, consequently, will only be described briefly here. The flip-flop includes a first circuit branch comprising an N-type insulated-gate field-effect transistor 32 and a P-type transistor 34 having their conduction paths, e.g. source-drain paths, connected in series between circuit ground and the positive terminal of a source 36 of $V_1$ volts, the negative terminal of source 36 being grounded. A second circuit branch comprises an N-type transistor 40 and a P-type transistor 42 having their conduction paths connected in series between circuit ground and the voltage source 36.

Feedback from the output of the first circuit branch to the input of the second branch is provided by a direct connection from output junction 44 to the gate electrodes of transistors 40 and 42. Feedback from the output of the second branch to the input of the first branch is by way of the conduction path of a normally "on" P-type transistor 50, which is connected between output junction 46 and the gate electrodes of transistors 32 and 34. Information is written into the flip-flop via the source-drain conduction path of an N-type transistor 56, one electrode of which is connected directly to the DIGIT line $D_1$. The gate electrodes of transistors 50 and 56 are connected to WRITE line X. In ordinary operation, the voltage on WRITE line X is held at ground potential by the output of a signal source 54, which may be one section of the decoder 16 of FIGURE 1. Thus, in the steady state, transistor 50 is biased on to complete the feedback path for the flip-flop, and transistor 56 is biased off, effectively decoupling the input of the flip-flop from the DIGIT line $D_1$.

In one steady state of the flip-flop, transistors 32 and 42 are biased on and transistors 40 and 34 are biased off. This may be considered the "set" state in which the flip-flop stores a binary "1" bit. The conducting states are reversed when the flip-flop is reset, i.e. storing a binary "0" bit. That one of a transistor's electrodes to which an arrowhead is affixed is the "source" electrode. Transistors 50 and 56 have arrowheads affixed to two electrodes, since these devices operate bidirectionally, one electrode functioning as source when current flows in one direction through the conduction path and the other electrode functioning as source when current flows in the opposite direction.

In order to provide isolation for data input and read output on a common DIGIT line, a coincidence gate means 66 is provided at one output of the flip-flop. In general, this coincidence gate means is one which has a conduction path connected between the positive terminal of source 36 and the common digit-sense line $D_1$. The gate 66 is illustrated as comprising a pair of N-type insulated-gate field-effect transistors 68, 70 having their conduction paths connected in series. Gate electrode 72 of transistor 68 is connected directly at the output terminal 46 of the flip-flop, and gate electrode 74 of transistor 70 is connected to READ line X, which is held at ground potential except during read-out of word X.

It should be mentioned at this point that WRITE line X and READ line X are common to all of the memory elements in the same row of memory 10 (FIGURE 1), and that the common digit-sense line $D_1$ is common to all of the elements in the same column of the memory. Dashed capacitor 78 represents the total capacitance on the digit-sense line $D_1$. The value of this capacitance, which may be quite high, is a function of the number of memory cells in the column and other factors. For high speed operation, means must be provided for charging and discharging this capacitance rapidly.

A sense-driver circuit 22, for DIGIT line $D_1$ is shown at the bottom of FIGURE 2. This circuit includes an NPN bipolar transistor 80 having its emitter electrode 82 connected directly to the digit-sense line $D_1$. An impedance element 86, illustrated as a resistor, is connected between the collector electrode 84 and the positive terminal of a source 88 of $V_2$ volts, the negative terminal of the source being grounded. An output terminal 90 is connected at collector electrode 84 for deriving sense output signals.

A second NPN transistor 94 is connected in the emitter circuit of transistor 80 and is biased for operation as a substantially constant current sink. Biasing is provided by a pair of resistors 96 and 98 connected in series between the positive terminal of source 88 and the negative terminal of a source 100 of $V_3$ volts, the positive terminal of the latter source being grounded. The base electrode 104 of transistor 94 is connected to the junction of resistors 96 and 98, and emitter electrode 106 is connected to source 100 by a resistor 108.

The base electrode 92 of first transistor 80 is connected to a source 112 of digital signals, which source may be one section of the data input device 20 of FIGURE 1. The digital signals have either a first, relatively high value or a second, relatively low value. Since transistor 80 operates as an emitter follower, the voltage at emitter 82 follows the applied base 92 voltage. The high level and low level input signals preferably have values which result in voltages of $+V_1$ volts and ground potential, respectively, at emitter electrode 82.

Consider now the operation of the FIGURE 2 circuitry. WRITE line X and READ line X are maintained at ground potential, except when writing a new word into the flip-flops in row X or sensing the outputs thereof. Transistors 56 and 70 are biased in the off condition, whereby the input to flip-flop 30 and the gate means 66 are effectively decoupled from the digit-sense line $D_1$ irrespective of the voltage applied on that line through transistor 80. Thus, it is possible to write into or read out of the elements in another row at this time without affecting the state of flip-flop 30 in any way, and without the flip-flop 30 or gate means 66 affecting the digit-sense line $D_1$ and other flip-flops coupled thereto.

When it is desired to write a binary "0" into flip-flop 30, control source 54 applies a voltage of $+V_1$ volts on WRITE line X. This voltage biases transistor 50 off in the flip-flop, and biases transistor 56 on. Input source 112 applies a low level signal to the base 92 of transistor 80, whereby the voltage on the digit-sense line remains or becomes ground potential. If capacitor 78 is charged at this time, the capacitor discharges rapidly through the constant current sink (transistor 94 and related circuitry), which is operated at a high current level. The ground potential on digit-sense line $D_1$, applied through on transistor 56, biases transistor 34 on and biases transistor 32 off. The voltage at output junction 44 then is $+V_1$ volts, which biases transistor 40 on and biases transistor 42 off. This is the reset state of the flip-flop. At the termination of the WRITE period, the voltage on WRITE line X falls to ground potential. Transistor 50 then turns on to complete the feedback loop, and transistor 56 turns off, thereby decoupling the flip-flop input from digit-sense line $D_1$.

To write a binary "1" into flip-flop 30, source 54 applies $+V_1$ volts on WRITE line X, whereby transistor 50 turns off and transistor 65 turns on. Input source 112 now operates to apply a high level input to transistor 80, whereby the voltage on digit-sense line $D_1$ rises to $+V_1$ volts. Emitter follower transistor 80 provides a low output impedance drive for rapidly charging capacitor 78. The $+V_1$ volts on the digit-sense line $D_1$, applied through on transistor 56, biases transistor 32 on and biases transistor 34 off. The voltage at output junction 44 then falls to ground potential, biasing transistor 42 on and biasing transistor 40 off. This is the set state of the flip-flop.

During a read, or sense, operation all the WRITE lines are held at ground potential, and all the READ lines except a selected one are held at ground potential. To sense the output of flip-flop 30, source 76 applies $+V_1$ volts on READ line X. This voltage biases transistor 70 on. Input source 112 operates to supply a low level signal to transistor 80, whereby the voltage on digit-sense line $D_1$ is at ground potential. If the flip-flop 30 is in the reset state at this time, the voltage at output junction 46 is ground potential, transistor 68 in the coincidence gate means 66 is held off, and no current flows in the digit-sense line $D_1$. All of the current for the current sink then is supplied by transistor 80, and there is a large voltage drop across collector resistor 86.

If the flip-flop is in the set state, however, transistor 68 is biased on by the output of the flip-flop, and transistors 68 and 70 provide a relatively low impedance path for current flow from source 36 to the current sink. The current flowing through transistor 80 is reduced an amount equal to the value of the current flowing through transistors 68 and 70. There is then less current flow through collector resistor 86, a smaller voltage drop across this resistor, and a higher voltage at output terminal 90. The voltage at this terminal 90 may be sampled at this time to determine the state of the flip-flop.

It should be noted that the sense operation does not destroy the information stored in flip-flop 30. Since the WRITE line X is held at ground potential, transistor 56 is biased off, and no new information can be written into the flip-flop. Also, current sensing is employed rather than voltage sensing. In particular, the voltage on the digit-sense line $D_1$ and, hence, the charge on capacitor 78, is determined by the input voltage to transistor 80, and is not dependent upon the operating states of transistors 68 and 70. It is the current flowing through transistors 68 and 70 and in the digit-sense line $D_1$, as determined by the state of flip-flop 30, that is sensed by circuit $22_1$, which current is converted into a voltage drop or rise across collector resistor 86.

Figure 3:
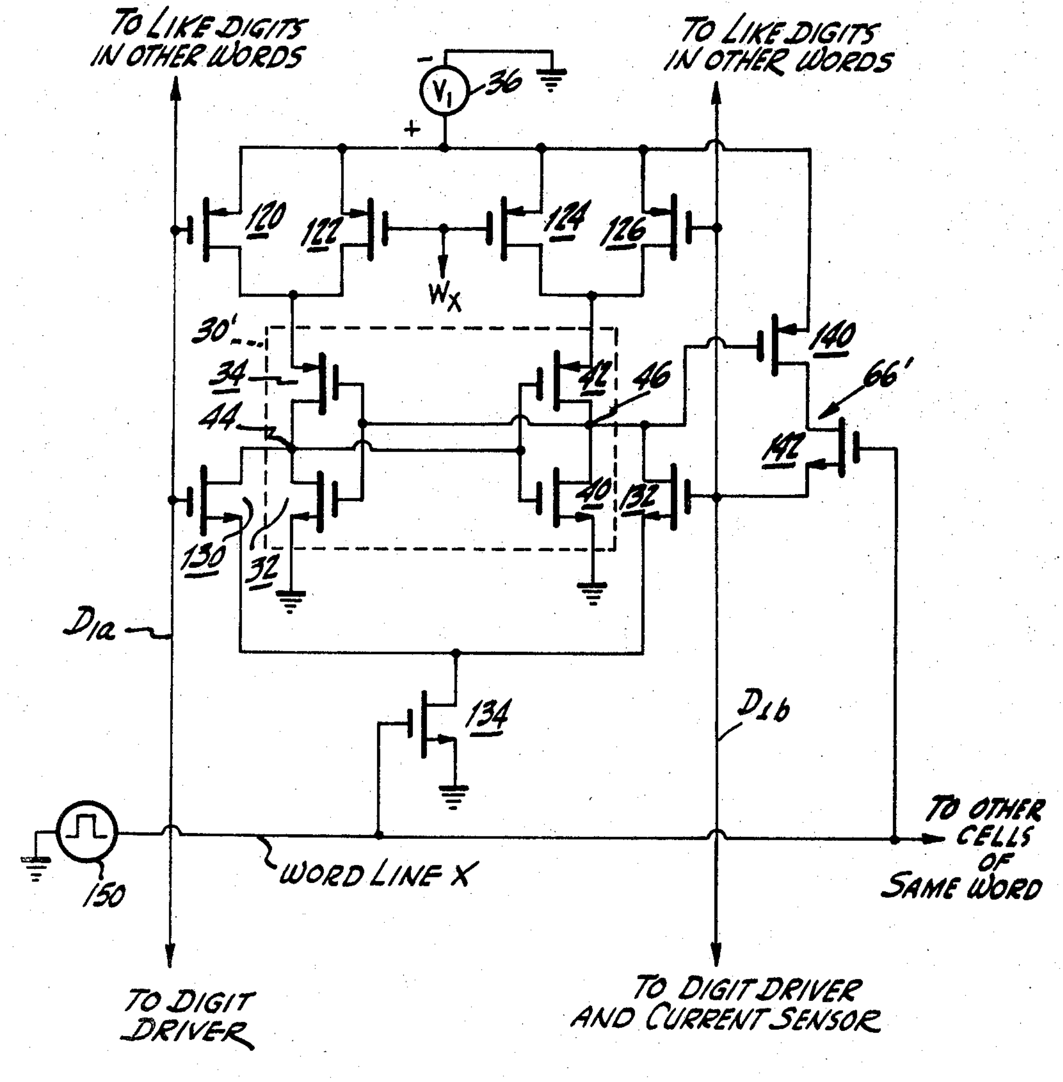
FIGURE 3 is a schematic diagram of another type of memory cell.

Another type of active memory cell is illustrated in FIGURE 3. This cell utilizes a single WORD line X for both write and read selection, but employs two DIGIT lines $D_{1a}$ and $D_{1b}$. DIGIT line $D_{1b}$ is used for both writing a "1" into the cell and for sensing the output of the cell. DIGIT line $D_{1a}$ is used for writing a "0" into the cell.

The flip-flop portion of the cell is shown within dashed box 30' and comprises two directly cross-coupled circuit branches. A first branch includes the series connected conduction paths of transistors 32 and 34, and the second branch includes the conduction paths of transistors 40 and 42. The first circuit branch is connected to voltage source 36 by way of the parallel connected conduction paths of two P-type insulated-gate field-effect transistors 120 and 122. Transistors 124 and 126 are similarly connected with the second branch. N-type transistors 130 and 132 have their conduction paths connected between output junctions 44 and 46, respectively, and circuit ground by way of a common N-type transistor 134.

An output coincidence gate means 66' comprises a P-type insulated-gate field-effect transistor 140 and an N-type transistor 142 having their conduction paths serially connected between the positive terminal of voltage source 36 and the digit-sense line $D_{1b}$. The gates of transistors 126 and 132 also are connected to this line $D_{1b}$. Transitor 140 has its gate connected to the output junction 46 of the flip-flop, and transistor 142 has its gate connected to WORD line X. In addition, the gates of transistors 122, 124 and 134 are connected to WORD line X which, in turn, is connected to the output of a READ/WRITE selection control source 150. Transistors 120 and 130 have their gates connected to DIGIT line $D_{1a}$. Both of the DIGIT lines $D_{1a}$ and $D_{1b}$ may be connected to separate circuits of the type shown at the bottom of FIGURE 2 and identified by reference character $22_1$. In the circuit for DIGIT line $D_{1a}$, however, the collector resistor 86 and output terminal 90 could be omitted since no sensing is performed on line $D_{1a}$.

In operation, the voltages applied on WORD line X and DIGIT lines $D_{1a}$ and $D_{1b}$ have a value of either $+V_1$ volts or ground potential (or approximately these values). When the voltage on WORD line X is zero, transistors 134 and 142 are biased off, whereby no information can be written into the memory cell, and no output of the cell can be sensed. Transistors 122 and 124 are biased on and provide low impedance paths from source 36 to the flip-flop circuit branches to maintain the state of the flip-flop.

To write a binary "1" into the flip-flop, source 150 applies $+V_1$ volts on WORD line X. Concurrently, voltages of zero and $+V_1$ volts are applied on DIGIT lines $D_{1a}$ and $D_{1b}$, respectively. Transistors 132 and 134 then are biased on and apply ground potential at output junction 46. Transistors 124 and 126 are now biased off, whereby the voltage at output junction 46 must remain at or fall to ground potential regardless of the biasing at the gates of transistors 40 and 42. With ground potential at junction 46, transistor 32 is biased off and transistor 34 is biased on. Thus, the voltage at output junction 44 remains at or rises to $+V_1$ volts (transistor 120 is biased on at this time by the ground potenital on DIGIT line $D_{1a}$). This voltage turns transistor 40 on and biases transistor 42 off. This is the set state of the flip-flop in which a binary "1" is stored, and the voltage at junction 46 is at ground potential (opposite to the conditions for the flip-flop of FIGURE 2).

To write a 0 into the flip-flop, $+V_1$ volts is applied on WORD line X and DIGIT line $D_{1a}$, and ground potential is applied on the DIGIT line $D_{1b}$. Transistors 120, 122 and 124 then are biased off and transistors 130 and 134 are biased on. The voltage at output junction 44 is driven to ground potential, turning transistor 42 on and turning transistor 40 off. This is the reset state of the flip-flop, and the voltage at output junction 46 is $+V_1$ volts.

To sense the output of the flip-flop, both of the DIGIT lines $D_{1a}$ and $D_{1b}$ are held at ground potential, and the voltage on WORD line X is raised to $+V_1$ volts. Although transistor 134 is now biased on, no new information is written into the flip-flop because transistors 130 and 132 are biased off. Transistors 120 and 126 remain on and maintain the status of the flip-flop. Transistor 142 in the coincidence gate means 66' is biased on by the $+V_1$ volts on WORD line X. If a "1" is stored in the flip-flop, the voltage at output junction 46 is zero and transistor 140 then is biased on. There is then a relatively low impedance path through transistors 140 and 142, and current flows from source 36 to the digit-sense line $D_{1b}$. This current results in a change of voltage at output terminal 90 of the sense circuit $22_1$ (see FIGURE 2), which output voltage may be sampled or strobed at this time.

Since the sense circuit $22_1$ has a relatively low impedance, there is little or no change in voltage on DIGIT line $D_{1b}$ during a sense operation. Stated in another way, output sensing is by way of current rather than voltage, and the voltage on the DIGIT line $D_{1b}$ and, hence, the charge on the load capacitance, is not affected by the state of the sensed flip-flop during a sense operation. It should be noted, however, that if a slight rise in voltage should occur on the line $D_{1b}$ during the sensing of a stored "1," such rise, should it be sufficient to bias transistor 132 on, would only tend to reinforce the state of the flip-flop, since the voltage at output junction 46 is zero at this time.

What is claimed is:

1. The combination comprising:

a flip-flop having input means and an output point;

a common input-sense line connected to said input means;

a point of first potential;

coincidence gate means having a conduction path connected between said point of first potential and said common input-sense line, a first control electrode connected to said output point, and a second control electrode;

means for applying control signals at said second control electrode; and current sensing means connected to said common input-sense line.

2. The combination as claimed in claim 1, including means for maintaining the voltage on said common input-sense line at a second, relatively fixed potential, which differs from said first potential, when a control signal is applied at said second control electrode to sense the output of said flip-flop.

3. The combination as claimed in claim 1, wherein the active elements of said flip-flop are insulated-gate field-effect transistors, and where said coincidence gate means is an insulated-gate field-effect transistor means.

4. The combination as claimed in claim 3, wherein said field-effect transistor means comprises first and second insulated-gate field-effect transistors each having a source, a drain and a gate, wherein said conduction path comprises the series connected source-drain paths of the first and second transistors, wherein the gates of the first and second transistors are the said first control electrode and second control electrode, respectively, and wherein a control signal applied at said second control electrode has a polarity and magnitude to switch the source-drain path of the second transistor from a relatively high impedance condition to a relatively low impedance condition.

5. The combination as claimed in claim 1, wherein said current sensing means includes: a bipolar transistor having an emitter electrode connected to said common input-sense line, and a collector electrode; an impedance element connected in the collector circuit of said bipolar transistor; and substantially constant current means connected in the emitter circuit of said bipolar transistor.

6. The combination as claimed in claim 5, wherein said impedance element is a resistor, wherein an output terminal is connected to a point in said collector circuit, and wherein said current sensing means further includes means for connecting the base electrode of the bipolar transistor to a source of digital signals having first and second values.

7. The combination as claimed in claim 6, wherein said emitter electrode has said first potential and said second potential when the input applied at said base electrode has been first and second values, respectively.

8. The combination as claimed in claim 1, further including a second input line, and wherein said flip-flop comprises: a first circuit point and a second circuit point; first, second, third, fourth and fifth insulated-gate field-effect transistors of one conductivity type and sixth, seventh, eighth, ninth, tenth and eleventh insulated-gate field-effect transistors of an opposite conductivity type, each transistor having a source-drain path and a gate electrode; the source-drain paths of the eighth and ninth transistors being connected in parallel with each other and in series with the source-drain paths of the sixth and first transistors, in that order, between said first circuit point and said second circuit point; the source-drain paths of the tenth and eleventh transistors being connected in parallel with each other and in series with the source-drain paths of the seventh and second transistors, in that order, between said first circuit point and said second circuit point; a first feedback connection from the junction of the source-drain paths of the first and sixth transistors to the gate electrodes of the second and seventh transistors; the source-drain paths of the third and fifth transistors being serially connected, in that order, from said junction to said second circuit point; a second feed-back connection from the junction of the source-drain paths of the second and seventh transistors to the gate electrodes of the first and sixth transistors; the source-drain path of the fourth transistor being connected in series with the source-drain path of the fifth transistor, in that order, between the last said junction point and said second circuit point; means connecting the gate electrodes of the fifth, ninth and tenth transistors to said control signal applying means; means connecting the gate electrodes of the third and eighth transistors to said second input line; and means connecting the gate electrodes of the fourth and eleventh transistors to the common input-sense line.

9. The combination comprising:

a flip-flop having an input point and an output point;
a common input-sense line coupled to said input point;
coincidence gate means having an output electrode connected to said input-sense line, a second electrode connected to said output point, and a third electrode;
means for applying control signals at said third electrode; and
current sensing means connected to said common input-sense line.

10. The combination as claimed in claim 9, wherein the active elements of the flip-flop are insulated-gate field-effect transistors, and wherein the coincidence gate means is an insulated-gate field-effect transistor means.

References Cited

UNITED STATES PATENTS

| | | | |
|---|---|---|---|
| 3,067,336 | 12/1962 | Eachus | 307—247 X |
| 3,173,130 | 3/1965 | Lowry | 307—238 X |
| 3,267,295 | 8/1966 | Zuk | 307—279 X |
| 3,310,686 | 3/1967 | Valentine | 307—247 X |

ARTHUR GAUSS, *Primary Examiner.*

D. D. FORRER, *Assistant Examiner.*

U.S. Cl. X.R.

307—205, 218, 246, 247, 251, 254, 279; 340—173